(12) United States Patent
Altmikus

(10) Patent No.: US 11,466,662 B2
(45) Date of Patent: Oct. 11, 2022

(54) ACTUATOR DEVICE FOR A WIND TURBINE, WIND TURBINE AND ASSEMBLY METHOD

(71) Applicant: Wobben Properties GmbH, Aurich (DE)

(72) Inventor: Andree Altmikus, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/970,899

(22) PCT Filed: Mar. 1, 2019

(86) PCT No.: PCT/EP2019/055195
§ 371 (c)(1),
(2) Date: Aug. 18, 2020

(87) PCT Pub. No.: WO2019/166648
PCT Pub. Date: Sep. 6, 2019

(65) Prior Publication Data
US 2020/0386205 A1    Dec. 10, 2020

(30) Foreign Application Priority Data
Mar. 1, 2018    (DE) .................. 10 2018 104 731.2

(51) Int. Cl.
*F03D 7/02*        (2006.01)
*F03D 13/10*       (2016.01)
(Continued)

(52) U.S. Cl.
CPC .......... *F03D 7/0232* (2013.01); *F03D 1/0675* (2013.01); *F03D 13/10* (2016.05); *F03G 7/005* (2013.01); *F05B 2240/3052* (2020.08)

(58) Field of Classification Search
CPC ........ F03D 7/0232; F03D 7/022; F03D 7/024; F03D 7/0224; F03D 13/10; F03D 1/0675; F05B 2240/3052
See application file for complete search history.

(56) References Cited

U.S. PATENT DOCUMENTS

| 4,524,294 A | * | 6/1985 | Brody ................. H01L 41/08 310/311 |
| 6,999,221 B1 | * | 2/2006 | Sarkisov ............ H01L 41/08 359/244 |

(Continued)

FOREIGN PATENT DOCUMENTS

| DE | 102016116138 A1 | 3/2018 |
| EP | 2899395 A1 | 7/2015 |

(Continued)

OTHER PUBLICATIONS

Iwaso et al., "Fast response dry-type artificial molecular muscles with [c2]daisy chains", Nature Chemistry, vol. 8, Jun. 2016, pp. 625-632.

(Continued)

*Primary Examiner* — Courtney D Heinle
*Assistant Examiner* — Ryan C Clark
(74) *Attorney, Agent, or Firm* — Seed Intellectual Property Law Group LLP

(57) ABSTRACT

An actuator device for a wind turbine, in particular for a rotor blade of a wind turbine, and also to an associated wind turbine and a method of assembly, with an actuator component and a control component, wherein the actuator component has at least one actuator layer with a preferential direction and, substantially parallel to the actuator layer, at least one exciting layer, wherein the actuator layer comprises a photoactuator, wherein the photoactuator is designed to change a strain and/or stress of the actuator layer in the preferential direction on the basis of excitation light, (Continued)

wherein the exciting layer is designed to guide excitation light into the actuator layer, wherein the control component comprises a light source and a light guide, wherein the light source is arranged away from the exciting layer and is connected to the exciting layer by means of the light guide and wherein the light guide runs in different directions through the exciting layer.

20 Claims, 14 Drawing Sheets

(51) Int. Cl.
*F03D 1/06* (2006.01)
*F03G 7/00* (2006.01)

(56) References Cited

U.S. PATENT DOCUMENTS

| | | | | |
|---|---|---|---|---|
| 7,922,450 | B2* | 4/2011 | Narasimalu | F03D 1/0675 416/23 |
| 2003/0156991 | A1* | 8/2003 | Halas | F16K 99/004 422/400 |
| 2009/0097976 | A1* | 4/2009 | Driver | F03D 7/022 416/42 |
| 2010/0247314 | A1 | 9/2010 | Narasimalu | |
| 2019/0226449 | A1 | 7/2019 | Altmikus | |

FOREIGN PATENT DOCUMENTS

| | | |
|---|---|---|
| JP | H0416793 A | 1/1992 |
| JP | H04340383 A | 11/1992 |
| JP | 2019537741 A | 12/2019 |
| WO | 2006/016907 A2 | 2/2006 |
| WO | 2017/037230 A1 | 3/2017 |

OTHER PUBLICATIONS

Morimoto et al., "A Diarylethene Cocrystal that Converts Light into Mechanical Work", Journal of American Chemical Society, vol. 132, No. 40, Sep. 21, 2010, pp. 14172-14178.

Shepherd et al., "Molecular actuators driven by cooperative spin-state switching", Nature Communications 4:2607, Oct. 24, 2013, pp. 1-9.

Usaki et al., "Light Driven SMA Actuator Using Optical Waveguide Made Of Past Type Organic Material", 2014 International Symposium on Micro-NanoMechatronics and Human Science (MHS), IEEE, Nov. 2014, pp. 1-6.

* cited by examiner

ACTUATOR DEVICE FOR A WIND TURBINE, WIND TURBINE AND ASSEMBLY METHOD

BACKGROUND

Technical Field

The following invention relates to an actuator device for a wind turbine, in particular for a rotor blade of a wind turbine, to a wind turbine with this actuator device and also to a method of assembly for assembling an actuator device.

Description of the Related Art

Actuators convert signals into mechanical motion or other physical variables, such as for example pressure, temperature, et cetera. The signals are often transmitted by way of electrical lines. Known actuators are, for example, bimetallic actuators, hydraulic or pneumatic actuators and piezo actuators, to name just a few.

When they are used in wind turbines, in particular in rotor blades of wind turbines, actuators control, for example, the lift, by controlling rotor blade flaps and/or causing a twisting of the rotor blade itself. One disadvantage of the known actuator devices for wind turbines is the susceptibility to lightning strikes that the electrical lines entail. It would therefore be desirable to provide an actuation mechanism for rotor blades of wind turbines that has a lower accompanying risk of lightning strikes.

The German Patent and Trade Mark Office has searched the following prior art in the priority application relating to the present application: EP 2 899 395 B1.

BRIEF SUMMARY

Provided is an actuator device for a wind turbine, a wind turbine with this actuator device and a method of assembly for assembling an actuator device that ensure greater operational reliability.

In one aspect, an actuator device for a wind turbine, in particular for a rotor blade of a wind turbine, with an actuator component and a control component is provided. The actuator component has at least one actuator layer with a preferential direction and, substantially parallel to the actuator layer, at least one exciting layer. The actuator layer comprises a photoactuator, wherein the photoactuator is designed to change a strain and/or stress of the actuator layer in the preferential direction on the basis of excitation light. The exciting layer is designed to guide excitation light into the actuator layer by coupling out in a uniformly distributed manner the light introduced at the edge of the exciting layer by diffusion perpendicular to the surface of the exciting layer. The control component comprises a light source and a light guide, wherein the light source is arranged away from the exciting layer and is connected to the exciting layer by means of the light guide. The light guide runs in different directions through the exciting layer. Preferably, the light guides have a counter-running element; particularly preferably, the different directions run approximately or exactly counter to one another.

A photoactuator has the property of converting incident light directly into mechanical motion, without, for example, first converting it into electrical energy. The use of a photoactuator consequently makes it possible to simplify the two conversion processes that are usually required in the case of light-controlled actuators, to be specific first the conversion of the light energy into electrical energy and subsequently the conversion of the electrical energy into mechanical energy.

The fact that the control component has a light guide which connects the light source to the exciting layer makes it possible to provide the actuator component without electrical connecting lines, or electrically conducting components. The light of the light source guided through the light guide influences the photoactuator, which converts the incident excitation light directly into strain and/or stress of the actuator layer.

The fact that the light guide runs in different, in particular opposite, directions over through the exciting layer makes a particularly uniform light input into the exciting layer into the actuator layer possible. In particular, the fact that the direction and the course of the light guide is not constant means that allowance can be made for a non-uniform light output along the length of the light guide. The direction of extent of the light guide is preferably at an angle to the plane of the exciting layer. Particularly preferably, the light guide extends in both, opposite directions, perpendicularly to the exciting layer. Similarly, it is particularly preferred as advantageous that the light guide runs at an edge and in particular perpendicularly to an edge of the exciting layer. This makes simple combinations of the light guide and the actuator component possible.

It is accordingly particularly advantageous if the different directions in any event have an element or a directional component that runs counter or oppositely. Accordingly, the element of the light input that runs counter has in any event precisely reversed propagating properties into the exciting layer into the actuator layer. To put it another way, it can in this way be ensured that, as a result of the reversed propagating properties, the sum of the element that is input in a first direction and the element that is input in the counter-running direction remains approximately constant. This is due to the fact that, in a known way, the light output often decreases with distance in the guide.

In one embodiment, the actuator component is formed as a stack actuator component with a multiplicity of stacked actuator layers and exciting layers. The light guide is formed over a multiplicity of edges of the exciting layers on at least one layer surface of the stack actuator component.

One or more advantages become particularly clear when a multiplicity of exciting layers in a stack actuator arrangement is assumed. Then, a direct attachment of each individual exciting layer to the light guide is no longer meaningfully possible. Coupling of the light from the light guide into the multiplicity of exciting layers preferably takes place in this case by the light guide being led in different, in particular opposite, directions over the edges of a number of exciting layers, and in particular all of the exciting layers stacked one on top of the other.

To be understood in the present case as a layer surface is a surface of the stack that does not just comprise a single one of the exciting layers or the actuator layers but surface components of a number of the layers stacked one on top of the other. This may be for example a side face or a lateral surface of a rectangularly or cylindrically stacked actuator component.

In one embodiment, the actuator device has at least two light guides, wherein at least two of the light guides enter the exciting layer from different sides, in particular in a counter-running manner.

The entry of a number of light guides at different points or from different sides of the exciting layer or at least one of the exciting layers makes it possible to compensate for a distribution of the light input along the light guide, that is to say a light input varying over the length of the light guide. Thus, an approximately homogeneous illumination of the exciting layer can be ensured by the sum of the light inputs of the multiple light guides.

In one embodiment of the actuator device, the direction of the light guide from the light source is referred to as a light guiding direction of the light guide or guides, wherein adjacent portions of different light guides in the exciting layer have at least partially opposite light guiding directions.

Opposite light guiding directions have the effect that the light output generally decreasing with length is compensated as the length of the one light guide becomes greater by the simultaneously increasing light yield of the adjacent portion of another light guide, in the case of which the light guiding direction runs oppositely.

In one embodiment of the actuator device, a light output from the light guide decreases with the length of the light guide, wherein at least two light guides run in the exciting layer in such a way that a uniform light input into the actuator layer takes place.

In one embodiment of the actuator device, at least two light guides run counter to one another, at least in certain portions, through the exciting layer. Also in this embodiment, the particular advantage is evident whenever a number of layers of a stack actuator stacked one on top of the other are run through by the light guides counter to one another. Preferably, the light guides then run along the edges of the multiple stacked layers.

In one embodiment of the actuator device, an entry point of a first of the at least two light guides into the exciting layer is adjacent to an exit point of a second of the at least two light guides.

Particularly preferably, the entry point of the first of the at least two light guides into the stack of the stack actuator is adjacent to an end point of the second light guide out of the stack. Consequently, the point of the first light guide that provides the highest light input, specifically the entry point, is in the proximity of the point of the second light guide with the weakest light input, specifically the end point. Consequently, in an advantageous way, the adjacent arrangement has the effect of ensuring an average light input of the exciting layer that is virtually constant over the entire surface area.

In one embodiment of the actuator device, the at least two light guides respectively run in a meandering form through or along the exciting layer, wherein substantially parallel portions of the two light guides respectively alternate in the exciting layer.

In one embodiment of the actuating device, the at least two light guides are overlaid in the region of the loops of the meander in which the direction of the light guides is substantially reversed.

In this design, the light guides may for example have a substantially identical meandering course, which are then set one inside the other or in an offset manner. In the regions in which the changes in direction of the loops of the meander occur there is then an overlaying of the two light guides, while the regions that substantially have no change of direction run parallel and are not overlaid.

Preferably, the loops of the meander are formed in a peripheral region or outside the stack of exciting layers and actuator layers, in that generally no light leaves the light guides. However, the loops of the meander may also be arranged within the stack arrangement of the actuator component, and accordingly these regions of course also make a contribution to the light input into the exciting layer or exciting layers.

In one embodiment of the actuator device, the actuator component has a substantially cylindrical form with a hollow bore in the interior, wherein the light guide or guides is or are arranged substantially within the hollow bore. Since the light input advantageously takes place in the middle of the cylinder, a particularly uniform light input is possible. The cylinder axis of the cylindrically formed actuator component preferably corresponds in this design to the stacking direction of a stack actuator component, wherein other arrangements of the layers, for example lying in the surface area of the cylinder wall, are also possible.

In one embodiment of the actuator device, the region of the end of the light guide remote from the light source has a nano coating. The nano coating preferably provides diffuse or directed light output around the light guide or in sub-portions of the circumference of the light guide in exactly the area in which a light output is desired. Of course, the nano coating is only one possibility for enabling the light output from the light guide, with a person skilled in the art also being familiar with alternatives to this.

In one embodiment of the actuator device, the control component comprises multiple light guides, wherein the multiple light guides are configured to guide different wavelengths and/or spectral ranges.

In addition to making the light input more uniform, as in the designs described above, by counter-running light guides with a decreasing radiating intensity along their length, also possible are designs in which either each individual one of the at least two light guides covers light of a wavelength of its own in each case or a spectral range of its own in each case. In a further preferred design, a respectively counter-running configuration of light guides for two wavelengths or spectral ranges requires at least four light guides.

A two-colored design is particularly advantageous in an embodiment in which the photoactuator is activated by one wavelength or one spectral range and is deactivated by the other wavelength or the other spectral range.

Depending on the geometrical design of the actuator stack, in the case of one-area introduction of light alternately mixed fiber orientations of the two wavelengths or spectral ranges are possible. In the case of at least two-area introduction of light, introductions of light with in each case only one wavelength or one spectral range per surface area are similarly possible for the introduction of the light.

In one embodiment, the photoactuator comprises at least one photostrictive actuator and/or photomechanical actuator.

Photostriction is the direct conversion of irradiated light into strain. Photomechanical actuators quite generally produce mechanical motion as a reaction to irradiation of light, irrespective of strain. At the same time, photomechanical actuators also comprise those that are based on secondary effects of light irradiation, such as for example heating.

The photoactuator is preferably made in such a way that the excitation of the photoactuator is initiated directly as a primary effect by the exciting light. In addition or as an alternative, it may be that secondary effects, for example due to thermal heating as a result of the incident light, as excitation of the photoactuator can be used for doing mechanical work, for example for changing a strain and/or stress in the preferential direction.

In one embodiment, the photomechanical actuator comprises an actuator from at least one of the following groups: a) polarized photomechanical actuators, b) liquid-crystal-based photomechanical actuators, c) photomechanical actuators based on optothermal transitions, d) charge-induced photomechanical actuators and e) photomechanical actuators based on radiation pressure.

Polarized photomechanical actuators are optomechanical actuators that exhibit a light-induced mechanical deformation when they are irradiated with polarized light. One example of a material that exhibits such an effect is a glass, that is to say an amorphous solid, which comprises one or more elements from the group of chalcogens. Liquid-crystal-based photomechanical actuators have already been demonstrated, for example, for nematic elastomers. For example, it has been possible to demonstrate for polymer networks which contain azobenzene liquid crystalline fragments that the nematic order can be suppressed or restored by optomechanical actuation. That is to say that optical irradiation can, for example, deform the azobenzene polymer films on the basis of the liquid-crystalline order.

Optothermal transitions are substantially the direct optical equivalent of electrothermal transitions and are based on parts of the energy of the excitation light being absorbed by the medium and converted into thermal energy. Generally, in addition to the other photoactuating effects, photoactuators always also have at least an element of the actuation mechanism based on optothermal transitions.

In the case of charge-induced photomechanical actuators, photons are absorbed in a semiconductor, free electrons are excited from the valence band into the conduction band and this leaves holes in the lattice, which cause a local mechanical strain in the material.

Photomechanical actuators based on radiation pressure are based on the momentum transfer between light and the actuator structure. These physical principles are only some of those possible that cause a photoactuator to change a strain and/or stress of the actuator layer. Other possible effects are conceivable, for example the photoactuator may comprise a shape-memory polymer that is optically activated or a nanostructure that has stresses due to local uneven distribution of photon-generated charges.

In one embodiment, the photoactuator comprises at least one material belonging to one of the following groups:
  liquid-crystalline materials, in particular liquid-crystal elastomers;
  photoisomerizable organic compounds, specifically azo compounds, for example azobenzenes, and also photochromic organic compounds, in which the photochromic color change is combined with an isomerization of an isomer with an open ring to an isomer with a closed ring, for example fulgides, hexatrienes, diarylethenes, dithienylcyclopentenes, preferably photochromic diarylethenes, in particular photochromic diarylethene single crystals, or cocrystals of photochromic diarylethenes, for example 1,2-bis(2-methyl-5-(1-naphthyl)-3-thienyl)perfluorocyclopentenes, with compounds comprising perfluorinated condensed ring systems, for example perfluoronaphthaline, in particular cocrystals of 1,2-bis(2-methyl-5-(1-naphthyl)-3-thienyl)perfluorocyclopentenes with perfluoronaphthaline;
  spin-crossover materials, in particular spin-crossover complexes, for example an [Fe(L){M(CN)4}] scaffold, wherein L is a ligand, for example a heteroaromatic compound with at least one nitrogen atom in the aromatic ring structure, for example pyrazine or 3-cyanopyridine, and M is a metal, for example Pt or Au, for example $\{Fe(3\text{-}CNpy)[Au(CN)_2]_2\}*2/3H_2O$;
  carbon nano objects, in particular carbon nano tubes (single-walled and multi-walled), carbon nano fibers and graphene;
  nano composites comprising carbon nano tubes, in particular multi-walled carbon nano tubes MWCNT and/or graphene, in a matrix, preferably an elastic matrix, in particular an elastic polymer matrix, for example a matrix comprising polydimethylsiloxane PDMS or a matrix comprising liquid-crystal elastomers, or a matrix comprising a shape-memory polymer;
  laminates comprising a film of carbon nano tubes combined with an elastomer film, for example a film containing an acrylic elastomer;
  photoresponsive polymers, for example in the form of light-sensitive hydrogels, in particular hydrogels of covalently crosslinked copolymer networks of a thermoresponsive polymer and a chromophore;
  biological photoresponsive molecules, for example photoresponsive proteins, for example, bacteriorhodopsin;
  chalcogenide glasses, for example $As_{50}Se_{50}$;
  ferroelectric materials, for example ferroelectric single crystals, and ferroelectric polycrystalline materials, for example polarized ferroelectric ceramic, for example lanthanum-modified lead zirconate titanate (PLZT), and doped lanthanum-modified lead zirconate titanate, for example lanthanum-modified lead zirconate titanate doped with $WO_3$;
  polar semiconductors;
  rotaxanes; and
  optically activatable piezo crystals.

The use of these and other materials as photoactuators, to name just a few examples, is known from the book "Optical Nano and Micro Actuator Technology" (CRC Press 2012), from the publications Iwaso et al., "Fast response dry-type artificial molecular muscles with [c2]daisy chains", Nature Chemistry, Vol. 9, June 2016, 625-631 doi: 10.1038/NCHEM.2513; Shepherd, H. J. et al., "Molecular actuators driven by cooperative spin-state switching" Nat. Commun. 4:2607 doi: 10.1038/ncomms3607 (2013) and Morimoto et al., "A Diarylethene Cocrystal that Converts Light into Mechanical Work", Journal of American Chemical Society 2010, 132, 14172-14178.

In one embodiment, the actuator layer is anisotropic in at least one direction. Since the actuator layer is anisotropic in at least one direction, not all of the characteristics of the actuator layer are dependent on a direction. In particular, the anisotropy preferably has the effect that the photoactuator or the actuator layer forms the preferential direction.

In one embodiment, the actuator layer comprises a fiber composite. A fiber composite preferably has two main components, to be specific a bedding matrix and reinforcing fibers. The fibers comprise, for example, glass fibers, carbon fibers, ceramic fibers, etc., without being restricted thereto. The material of the embedding matrix may comprise, for example, polymers such as thermosets, elastomers or thermoplastics, but also other elements such as cement, metals, ceramics, etc., without being restricted thereto. Such materials can be advantageously used particularly in the area of wind turbines.

In one embodiment, the photoactuator in the actuator layer is embedded in a matrix, in particular a resin matrix. The term resin refers to solid to liquid organic substances. In particular, resin refers to polymers as the base material for plastics. By means of a matrix, photoactuators can be embedded in the actuator layer in an advantageous form.

In one embodiment, the actuator component has at least two actuator layers with at least one exciting layer respectively lying in-between.

The arrangement in multiple layers is comparable to the known arrangement of a piezo stack. If the actuator component has many actuator layers lying one on top of the other, a preferential direction can be advantageously realized in the stacking direction. The actuator displacement is then proportional to the number of layers and can be advantageously scaled to certain extents.

However, the preferential direction does not have to correspond to the stacking direction in every embodiment. In particular in the case in which the actuator component comprises two actuator layers with an exciting layer lying in-between, the preferential direction may also lie in the plane of the actuator layers or of the exciting layer. Preferably, in this case the two actuator layers have different reactions to excitation light, for example the one exciting layer undergoes an extension under strain in the preferential direction, while the other exciting layer undergoes a compression in the preferential direction. This results in a bending of the actuator component. In other embodiments, the actuator layers may however also have the same reaction, resulting in an extension of the overall actuator component in the preferential direction in the plane of the layers.

In further embodiments, it is also possible for more than one exciting layer to be provided between two actuator layers. In this case, different excitation light can be introduced into the respective actuator layers.

In one embodiment, the actuator component is designed to apply by means of excitation light a force of 10 to 50 newtons per square millimeter ($N/mm^2$) of the cross-sectional area of the actuator component, wherein the cross-sectional area of the actuator component is perpendicular to the preferential direction.

A force in newtons per square millimeter of cross-sectional area corresponds to a pressure in megapascals; the range of 10 to 50 $N/mm^2$ is a value that is widely used for piezo actuators and allows applications in many areas, in particular of wind turbines.

Preferably, the cross-sectional area of the actuator component perpendicularly to the preferential direction is referred to as the actuator area and is preferably determined as the area of the entire actuator component, including the actuator layer and the exciting layer.

For a stack actuator, the actuator area is consequently preferably independent of the number of layers and corresponds to the surface area of one of the corresponding layers.

In one embodiment, the actuator component is configured as an extension actuator component, wherein a direction of extension corresponds to the preferential direction, which is substantially perpendicular to the at least one actuator layer, or the actuator component is configured as a bending actuator component, wherein the direction of extension is substantially perpendicular to the preferential direction of the actuator layer.

Extension actuator components allow a preferably linear mechanical deformation, wherein this linear mechanical deviation can be transformed, for example, into movement of another component. Preferably, the stack-like construction of the actuator component corresponds to an extension actuator component, wherein the linear extension displacement in this example corresponds to the stacking direction. An extension actuator component may in one embodiment be designed for activating a lift flap of a rotor blade of a wind turbine.

As a difference from this, a bending actuator component is designed to bend the actuator component in a direction of extension or deflection perpendicular to the preferential direction. The bending actuator component is preferably configured as a two-dimensional actuator component, which extends over a relatively great region of the component to be controlled. The preferential direction runs substantially in the plane in which the actuator component has its two-dimensional extent. Here, there may comprise in one embodiment one or more actuator layers and/or exciting layers lying in the plane, wherein the preferential direction then lies in the actuator layer, or in another embodiment multiple stacked layers perpendicular to the plane, wherein the preferential direction is then perpendicular to the plane of the respective actuator layers. The bending actuator component preferably has a small extent perpendicularly to the plane in which it has its two-dimensional extent in comparison with its other dimensions.

In one embodiment, such a bending actuator component is designed for controlling a servo flap of a rotor blade of a wind turbine. By contrast with the extension actuator component, the bending actuator comprises a much smaller number of actuator layers, or exciting layers, at least in the case where the layers are arranged parallel to the plane in which the bending actuator component has its two-dimensional extent, and takes up a greater surface area while being of a comparable volume.

In one embodiment, a ratio of the actuator area to a square of a reference length of the actuator component lies in a range of 0.0001 to 0.01 and, in particular in the case where the actuator component is configured as an extension actuator component, lies in a range of 0.01 to 1.

Referred to as a reference length of the actuator component is the ratio of the actuator displacement and the extension displacement. If, for example, an actuator is designed in such a way that an actuator displacement of 0.1 mm is required, which allows an extension under strain of 0.1%, this results in a reference length of 100 mm. This is of course an example, and the actual design of the actuator may be based on actual requirements.

The range of 0.01 to 1 for the ratio of the actuator area to a square of the reference length corresponds to a range such as that required in particular for lift flaps on wind turbines. The range of 0.0001 to 0.01 corresponds to a range such as that used in particular for the design of servo flaps for wind turbines.

In one embodiment, mechanical work that can be performed by the actuator component lies in a range of 100 to 10 000 joules per cubic meter ($J/m^3$) of actuator volume, wherein in particular in the case where the actuator component is configured as an extension actuator component the mechanical work that can be performed by the actuator component lies in a range of 1000 to 10 000 joules per cubic meter of actuator volume or in the case where the actuator component is configured as a bending actuator component lies in a range of 100 to 1000 joules per cubic meter of actuator volume.

Referred to as the actuator volume is the volume of the actuator component, wherein the actuator volume preferably comprises at least the actuator layer and the exciting layer. The mechanical work that can be performed in a range of 100 to 10 000 $J/m^3$ is possible in particular for the examples of photoactuators mentioned at the beginning, and can be achieved depending on the design of the actuator component.

Generally, the achievable energy density in the case of surface actuators is lower by approximately a factor of 10 than for a stack actuator. The range of 100 to 1000 $J/m^3$ of actuator volume can preferably be used for the activation of servo flaps of wind turbines. The range of 1000 to 10 000 $J/m^3$ of actuator volume is preferably designed for activating a lift flap of a wind turbine.

In one embodiment, the actuator component is configured as a bending actuator component and is designed to bend by excitation perpendicular to the preferential direction.

The bending actuator component is consequently preferably designed for bending perpendicularly to the plane of the preferential direction. In particular, the preferential direction lies in the plane in which the bending actuator component has a two-dimensional extent, for example is attached to a substrate or a surface of a component. As a result, a two-dimensional actuator component that directly brings about a deformation of the surface area to which the actuator is attached can be designed. The bending actuator component preferably corresponds in its operating principle to a bimetallic actuator and may be formed in a similar way. In one configuration of the bending actuator component, the preferential direction lies in the plane of the actuator layer, that is to say the one or more actuator layers run substantially parallel to the surface area on which the actuator is attached. In another configuration, the bending actuator component is made up of many layers, which run(s) substantially perpendicularly on the surface area on which the actuator is attached. In this case, the preferential direction also runs substantially perpendicularly to the parallel plane of the multiple actuator layers.

In one embodiment, a ratio of a height of the actuator component to a length of the actuator component in the preferential direction lies in a range of 0.001 to 0.1, in particular in a range of 0.002 to 0.02.

In this embodiment, the plane of the actuator layer spans the preferential direction and a direction perpendicular thereto. The mechanical work that can be performed by the actuator component is proportional to the width of the actuator component, which is perpendicular to the preferential direction. To put it another way, a differential contribution of the actuator component in the widthwise direction is constant and is preferably already determined by the ratio of the height to the length in the preferential direction. Actuator components in which this ratio lies in the preferred range are particularly well-suited for use on rotor blades of wind turbines.

For the example of a servo flap of a rotor blade of a wind turbine, the preferential direction may correspond to the direction of the profile of the rotor blade. The servo flap may then be provided, for example, with a certain length in the direction of the profile chord into the region of the trailing edge of the rotor blade of the wind turbine. The mechanical work to be performed for activating the servo flap is proportional to the width of the flap in the direction of the radius of the rotor blade, i.e., the work per unit in the widthwise direction is substantially constant over the radius of the rotor blade of the wind turbine from the hub to the tip of the blade. For example, such a servo flap may have a width of one meter. Since both the mechanical work that can be performed by the actuator component and the mechanical work that is required by the servo flap are proportional and depend linearly on the width of the actuator and of the servo flap, it is sufficient to specify the length of the actuator component and its height. The volume of the actuator component and the mechanical work that can be performed by it can be obtained by multiplying by the length, which corresponds to the length of the servo flap.

In one embodiment, a height of the actuator component perpendicularly to a plane of the at least one actuator layer lies in a range of 1 mm to 10 mm, preferably in a range of 3 mm to 7 mm and particularly preferably of approximately 5 mm.

Preferably, the term approximately should be understood as a rounding inaccuracy, that is to say that the range of 4.5 to, for example, 5.49 mm is to be understood as approximately the value of 5 mm. A height of the actuator component that lies in the preferred range meets the requirements particularly for use in the area of wind turbines.

In one embodiment, the exciting layer comprises ultrathin glass and/or polymer, in particular with a thickness of 20 μm to 100 μm.

Ultra-thin glass and/or polymer is of course only one example of a material that may be contained in the exciting layer. Other suitable materials are also conceivable. Ultra-thin glass or polymer advantageously allows that the exciting layer has the desired properties in spite of the very small thickness.

In one embodiment, the actuator component has a mirror coating, which is designed to reflect the excitation light, wherein the mirror coating at least partially surrounds the actuator component on at least one side face, in particular surrounds the actuator component on the side of the exciting layer that is opposite from the actuator layer.

Preferably, the mirror coating is designed for the wavelength of the excitation light. As a result of the mirror coating, it is possible to reduce light losses, for example due to excitation light escaping from the exciting layer instead of being guided into the actuator layer. In this way, an efficiency of the overall actuator component increases.

In one embodiment, the light guide is arranged in such a way as to introduce light into the exciting layer in a longitudinal direction, wherein the longitudinal direction lies in a plane of the exciting layer, wherein the plane of the exciting layer is defined by the longitudinal direction and the widthwise direction, wherein in particular the preferential direction substantially corresponds to the longitudinal direction or a direction deviating therefrom that lies in a plane of the at least one actuator layer in a case in which the actuator component is configured as a bending actuator component, or the preferential direction is substantially perpendicular to the longitudinal direction and/or the plane of the at least one actuator layer in a case in which the actuator component is configured as an extension actuator component.

The fact that the longitudinal direction lies in a plane of the exciting layer means that it is particularly easy to introduce light into the layer by means of the light guide. In other embodiments, the longitudinal direction may also be defined as a direction of the exciting layer, wherein one or more light guides introduce light into the exciting layer in the plane of the exciting layer, wherein the directions with which the light guide or light guides introduce light do not necessarily correspond to the longitudinal direction.

Preferably, in this embodiment a different effect of the photoactuator is used depending on whether the actuator component is configured as a bending actuator component or as an extension actuator component. To be specific, preferably a transversal effect of the photoactuator is used in the case of the bending component and a longitudinal effect of the photoactuator is used in the case in which the actuator component is configured as an extension actuator component. The transversal effect is comparable to the transverse effect, or d31 effect, known for piezo actuators and the longitudinal effect is comparable to the linear effect, or d33 effect. These are also just configurations that are mentioned by way of example; other effects, for example a shear effect or a combination of a transversal effect and a longitudinal effect, can also be used in other embodiments.

In one embodiment, the actuator device also has an amplification frame, which encloses the actuator component, wherein the amplification frame is arranged in such a way that an extension of the actuator layer in the preferential direction leads to a compression of the amplification frame perpendicularly to the preferential direction, wherein the amplification frame is designed for transformation between the movement in the preferential direction and substantially perpendicularly thereto.

In other words, such an amplification frame implements a displacement increasing system, with which displacement of the actuator can be transformed into a longer displacement in terms of movement. In particular in the case in which the actuator component has multiple layers, or is formed as a stack actuator, the achievable actuating displacements of the actuator component can be increased by means of the amplification frame in such a way that it is particularly suitable for applications in the wind turbine.

The mechanical energy that can be produced by the actuator is not changed by the transformation. Correspondingly, when there is an increased displacement distance, the force that can be applied over each displacement distance is reduced correspondingly. A transformation factor of an amplification frame lies in a range of 2 to 10, in particular at approximately 5, without being restricted thereto.

In one embodiment, the exciting layer has on the side or sides adjacent to the actuator layer at least one diffusion element for the diffuse introduction of excitation light into the actuator layer, wherein the diffusion element comprises in particular surface irregularities, preferably lasered and/or etched microcavities.

Preferably, the diffusion element achieves a uniform distribution of the excitation light in the actuator layer. In other embodiments, the diffusion element may alternatively or in addition be formed as an independent layer between the exciting layer and the actuator layer, or as part of the actuator layer. Other diffusion elements that are not based on surface irregularities are also conceivable.

In one embodiment, the exciting layer has a conversion element, which is designed for converting light from the light source into excitation light, wherein the excitation light has a different wavelength and/or a different spectrum than the light of the light source.

By means of a conversion element, it is not necessary that the light of the light source is adjusted exactly for the photoactuator. Consequently, even in the case in which light from the light source is not suitable as excitation light, the photoactuator can be excited once the light is converted into excitation light by the conversion element.

In one embodiment, the conversion element comprises a fluorescent or phosphorescent material. In particular when a phosphorescent material is used, an excitation of the photoactuator can consequently also take place after the irradiation by the light source is switched off. These materials are only examples however; other conversion elements are conceivable. Also, the conversion element as part of the exciting layer should only be understood as being mentioned by way of example, while in other embodiments an independent conversion element may be formed between the exciting layer and the actuator layer, or the conversion element may be formed as part of the actuator layer.

In a further aspect, a rotor blade of a wind turbine with an actuator device according to an embodiment and an active element is provided, wherein the actuator device is designed for controlling the active element.

The rotor blade with an actuator device consequently makes it possible that the active element that is provided on the rotor blade can be controlled without it having to be connected to electrical lines. All of the other benefits and advantages of the embodiments mentioned of the actuator device can also be transferred in the same way to the rotor blade. The active element preferably comprises a lift flap, a servo flap, a vortex generator or some other active element with which, for example, aerodynamic and/or acoustic properties of the rotor blade can be changed.

In one embodiment of the rotor blade, the actuator component of the actuator device is configured as a bending actuator component and the flap is configured as a servo flap, wherein the actuator component is mounted in surface contact over the region of the servo flap.

A servo flap is preferably a form-variable active element, that is to say that, by actuation, the servo flap itself changes in its shape, for example bends. The servo flap is preferably provided in a region of the blade tip of the rotor blade and comprises a region of 10 to 20% of the rotor blade profile, as seen from the trailing edge. The region of the blade tip comprises in particular the outer 30% of the length of the rotor blade in the radial direction, as seen from a rotor blade hub, while a servo flap may be provided a length in the direction of the radius of the rotor blade in the entire region of the blade tip or only in a partial region, for example of the order of magnitude of 1 m to 10 m.

The actuator force of the servo flap must be applied in a substantially evenly distributed manner over the entire region of the servo flap. For this reason, it is preferred that as large a region of the servo flap as possible is covered by the actuator device, which is configured as a bending actuator. This of course does not have to be a single two-dimensional actuator component; instead, multiple individual actuator components, which correspondingly cover parts of the servo flap and in each case have an independent control component, are also conceivable. The servo flap may, for example, be configured as a central layer of a bendable material, for example glass-fiber-reinforced plastic, wherein at least one bending actuator component is formed on the upper side and/or the underside of the central layer. For the shaping, an elastic material may also be formed over the central layer and the actuator component.

In one embodiment of the rotor blade, the actuator component of the actuator device is configured as an extension actuator component and the flap is configured as a lift flap, wherein the rotor blade also has a transforming unit for transforming the movement of the actuator component into a control of the lift flap.

A lift flap is preferably a discrete component, with, for example, an extent of 15 to 50% in the depthwise direction of the profile. The position of the lift flap is changed with respect to the rotor blade by means of the actuator device. For example, the lift flap is turned with respect to the rotor blade, in order to increase or reduce a lift. The transforming unit has in one embodiment a push/pull rod, with which the actuator movement is transformed into a movement of the lift flap as in the case of known lift flaps. Since the actuator device is configured as an extension actuator component, the extension actuator component produces a linear actuator movement, which can be easily transformed by the transforming unit.

In one embodiment of the rotor blade, the actuator device has an amplification frame, which encloses the actuator component, wherein the transforming unit has a push/pull rod for coupling the amplification frame to the lift flap.

The fact that the actuator unit has the amplification frame allows the shortest possible actuator displacement to be transformed into a longer movement of the amplification frame. Typical transformation ratios that can be achieved with such an amplification frame lie in the range of 2 to 10, that is to say that the actuator displacement can be increased in length by up to 2 to 10 times. Other transformations are also conceivable, for example multiple transforming devices, for example amplification frames, may also be connected in series. Instead of the push/pull rod or in addition thereto, the transforming unit may also comprise further elements in order to transform the movement of the actuator component into the control of the lift flap.

In a further embodiment, the rotor blade of the wind turbine has multiple active elements. The multiple active elements may, for example, be multiple lift flaps, multiple servo flaps, vortex generators or other active elements. In a further embodiment, a combined servo flap and lift flap may also be provided on the rotor blade. Respectively suitable configurations of the actuator device can then be used for the respective active element, or the combination of active elements.

In a further aspect, a wind turbine with a rotor blade according to an embodiment is provided.

In a further aspect, a method of assembly for assembling an actuator device according to an embodiment on a rotor blade according to an embodiment is provided, wherein the method comprises attaching the actuator component to a rotor blade of a wind turbine and/or connecting the control component to the actuator component.

BRIEF DESCRIPTION OF THE SEVERAL VIEWS OF THE DRAWINGS

The present invention is now explained in more detail below by way of example on the basis of exemplary embodiments with reference to the accompanying figures.

DETAILED DESCRIPTION

Figure 1A:
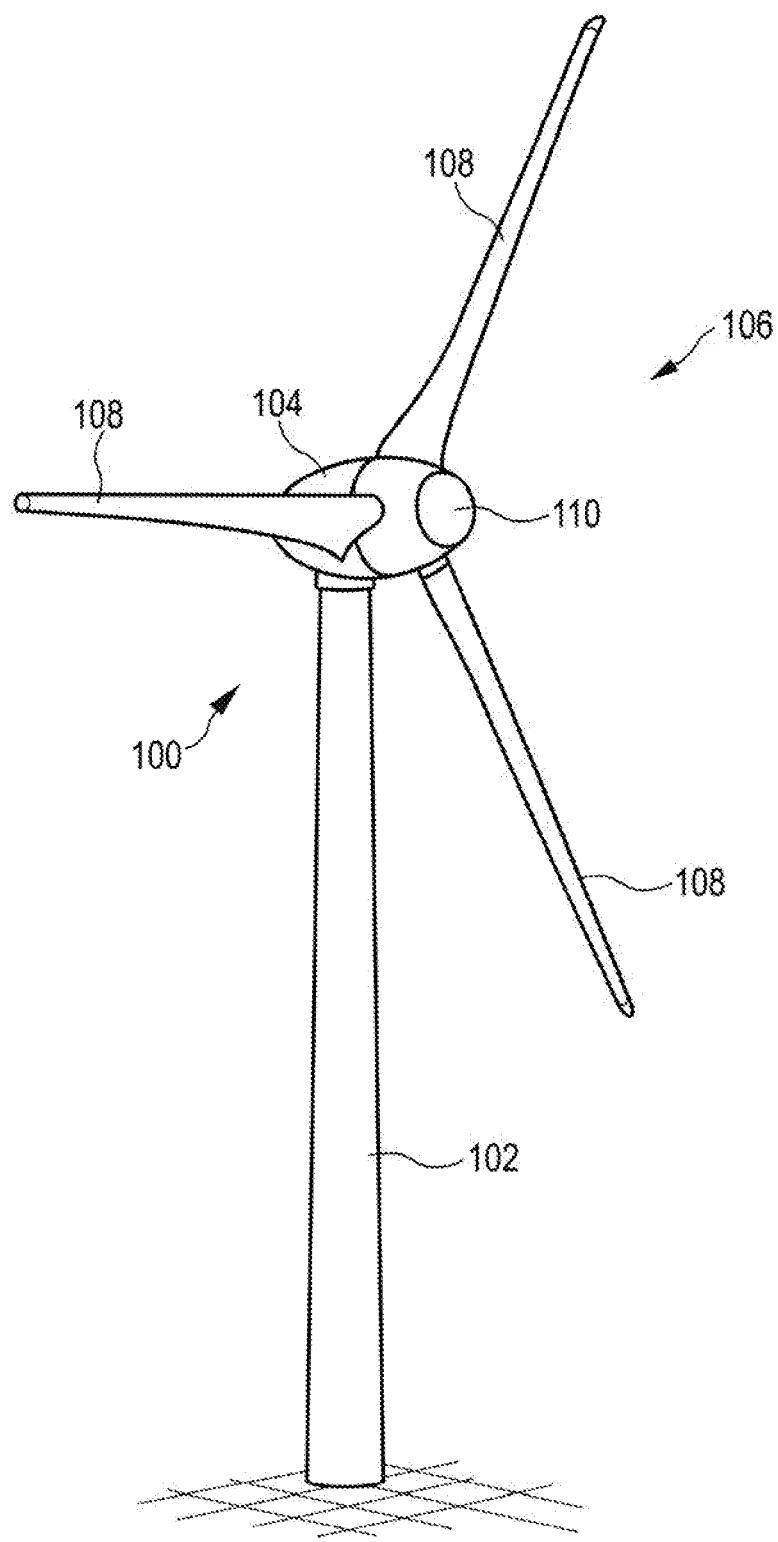
FIG. 1a shows a schematic view of a wind turbine.

FIG. 1a shows a wind turbine 100 with a tower 102 and a nacelle 104. Arranged on the nacelle 104 is a rotor 106 with three rotor blades 108 and a spinner 110. During operation, the rotor 106 is set in a rotational movement by the wind and as a result drives a generator in the nacelle 104.

Figure 1B:
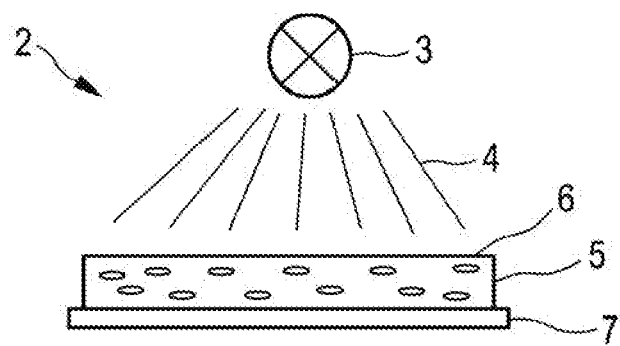
FIG. 1b shows a schematic view of a known actuator device.
Figure 2:
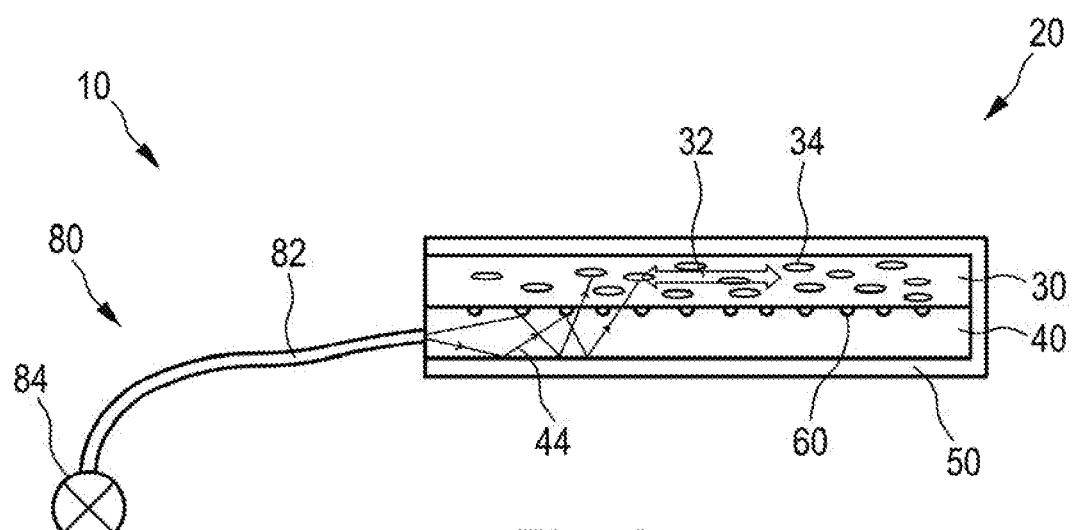
FIG. 2 shows a schematic view of an exemplary embodiment of an actuator device.

FIG. 1b shows a schematic view of a known actuator device 2, in the case of which excitation light 4 is guided onto an active layer 5 by means of a light source 3. The active layer 5 comprises a photoactuator 6, which brings about an extension under strain of the actuator layer 5 on the basis of the excitation light 4. The actuator layer 5 is attached on a substrate 7. The induced extension of the actuator layer 5 can, for example, cause the layer 5 including the substrate 7 to bend. The irradiation of excitation light 4 from the light source 3 takes place in the known example two-dimensionally and directly over the entire actuator layer 5, without use of a light guide or the like. FIG. 2 shows schematically and by way of example an actuator device 10, for example for a wind turbine 100, as shown in FIG. 1a. The actuator device 10 has an actuator component 20 and a control component 80. The control component 80 is preferably formed in such a way that it controls the actuating mechanism of the actuator component 20.

The actuator component 20 has in this example an actuator layer 30 with a preferential direction 32, shown horizontally in the example. The actuator layer 30 has a photoactuator 34, which is designed to change a strain and/or stress of the actuator layer 30 in the preferential direction 32, in dependence on light that is irradiated into the actuator layer 30. The actuator layer 30 is, for example, a resin matrix with embedded anisotropic crystals as a photoactuator 34. The preferential direction 32 and the photoactuators 34 are of course only chosen by way of example; in other exemplary embodiments, other materials are conceivable and/or other preferential directions are conceivable.

Substantially parallel to the actuator layer 30, the actuator component 20 also has an exciting layer 40. The exciting layer 40 is designed to guide excitation light 44 into the actuator layer 30. In the example of FIG. 2, the exciting layer 40 guides excitation light 44 over the entire length of the actuator component 20 and the actuator layer 30 that corresponds to the preferential direction 32. The exciting layer 40 may, for example, comprise ultra-thin glass or a polymer and be formed with a thickness of preferably 20 to 100 μm.

The control component 80 has a light guide 82 and a light source 84. The light source 84 is arranged away from the actuator component 20 and the light guide 82 is designed for guiding light emitted by the light source 84 into the exciting layer 40. The light source 84 may be designed to emit light of one or more wavelengths. The wavelengths of the emitted light preferably correspond to one or more wavelengths of light that is suitable for activating the photoactuator 34. In other exemplary embodiments, the wavelength of the light emitted by the light source 84 may also deviate from the wavelength that the photoactuator 34 requires for activation. For example, a conversion element (not shown) may then be provided in the exciting layer 40, for example an element that comprises a fluorescent or phosphorescent material.

Shown in FIG. 2 is a mirror coating 50, which encloses the actuator component 20 on multiple side faces and is designed to reflect the excitation light 44. The mirror coating 50 ensures that a large part of the light introduced into the exciting layer by way of the light guide 82 can be used for exciting the actuator layer 30. In other exemplary embodiments, the mirror coating 50 is only provided partially, in particular on the side of the exciting layer 40 that is opposite from the actuator layer 30.

Also shown in FIG. 2 is a diffusion element 60, which is provided between the actuator layer 30 and the exciting layer 40 and is designed to introduce excitation light 44 diffusely into the actuator layer 30. The diffusion element 60 may, for example, be formed as surface irregularities of the exciting layer 40, in particular as lasered and/or etched microcavities. In other exemplary embodiments, the diffusion element 60 may also be formed as part of the actuator layer 30 or as an independent element.

Figure 3:
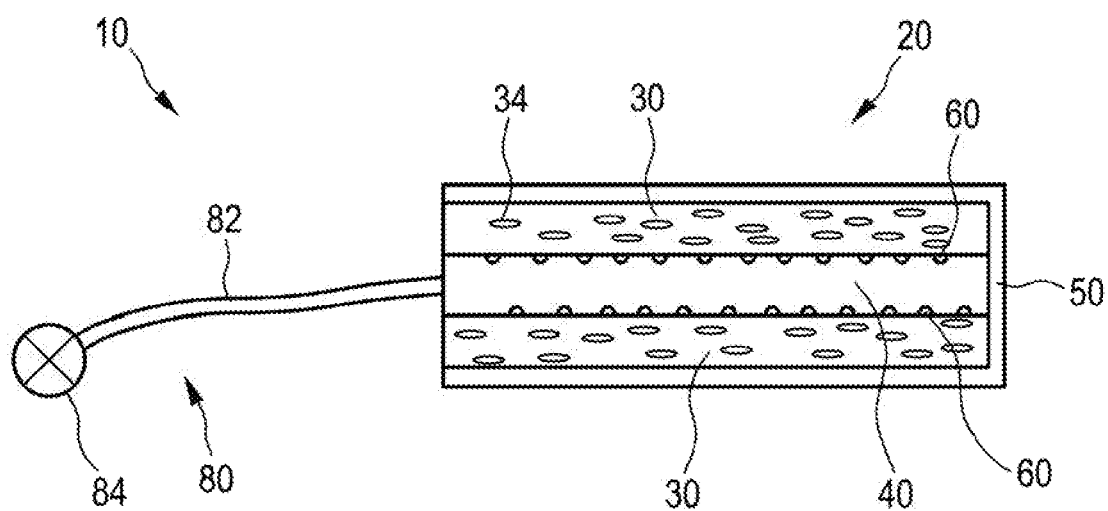
FIG. 3 shows a schematic view of a further exemplary embodiment of an actuator device.

FIG. 3 shows schematically and by way of example a further exemplary embodiment of an actuator device 10. The actuator device shown in FIG. 3 has two parallel actuator layers 30 with an exciting layer 40 lying there-between. Light from the exciting layer 40 can consequently enter one of the two actuator layers 30 either in the upward or downward direction. The actuator layers 30 may either be the same or different from one another, for example comprise photoactuators that have the same or different excitation characteristics. The preferential direction of the two actuator layers 30 may be the same or different.

Figure 4:
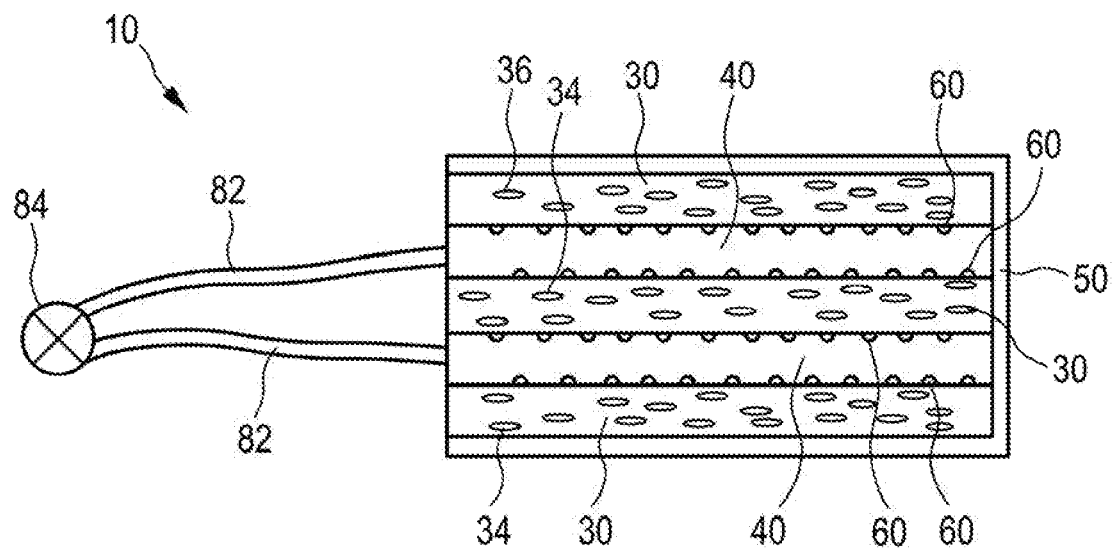
FIG. 4 shows a schematic view of a further exemplary embodiment of an actuator device.

FIG. 4 shows schematically and by way of example a further exemplary embodiment of an actuator device 10 with three actuator layers 30 and, parallel thereto, two exciting layers 40 lying there-between. Each of the exciting layers 40 is connected to the light source 84 by way of a light guide 82. In further examples, any desired number of arrangements of actuator layers 30 and exciting layers 40 stacked in this way may be created. With this form of stacked layer arrangements, the preferential direction preferably runs along the stacking direction, so that the stack becomes thicker or thinner when the actuator layer 30 or the actuator layers 30 is/are excited. Consequently, to be specific, the actuator displacement of an individual actuator layer 30 can be increased over the entire actuator device 10, since a contribution to the increase, that is to say an extension, of the actuator component 20 occurs for each of the actuator layers 30.

Figure 5A:
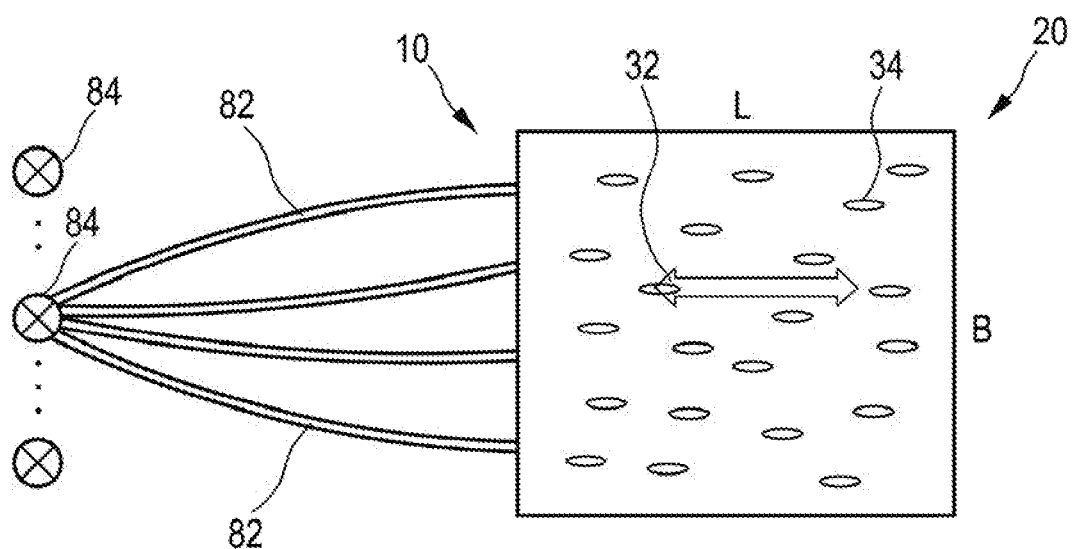
FIGS. 5a and 5b show schematic plan views of an exemplary embodiment of an actuator device.
Figure 5B:
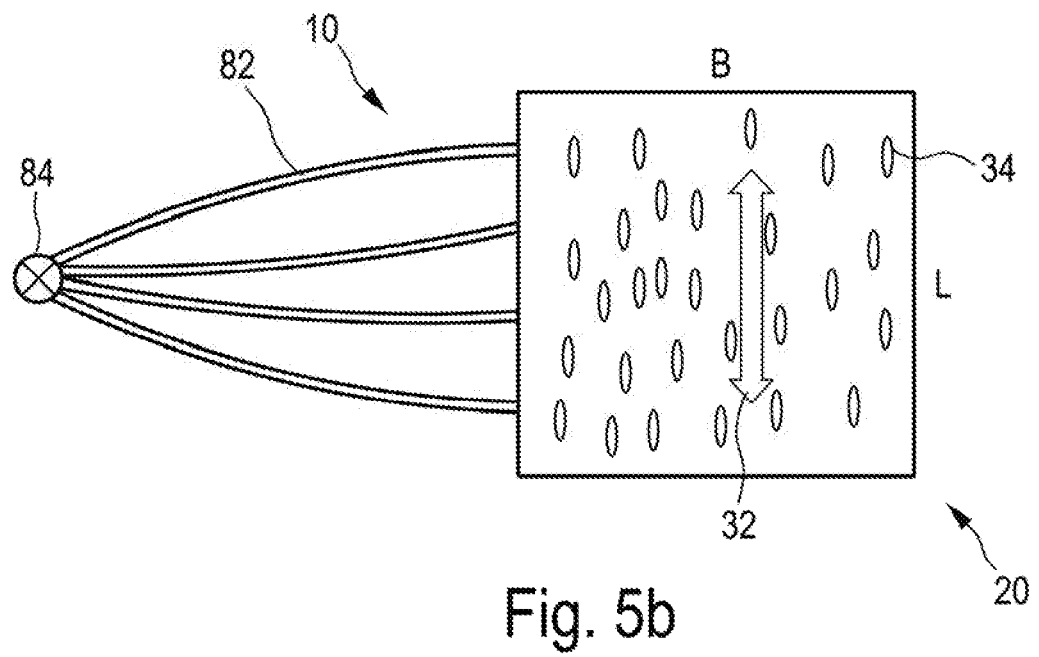

FIGS. 5a and 5b show schematically and by way of example plan views of an actuator device 10 or an actuator layer 30 with a photoactuator 34 thereof. FIG. 5a differs from FIG. 5b in the preferential direction, or the anisotropy of the photoactuator 34. L denotes the direction of extension of the actuator component 20, which corresponds to the preferential direction 32 in which the actuator layer 30 undergoes an extension or compression when it is excited. Shown perpendicularly thereto is the width B, which substantially undergoes no change. FIG. 5a shows the case in which the introduction of light by means of the light guide 82 takes place in a distributed manner over the widthwise direction B, that is to say the extension in the preferential direction 32 takes place in the direction of the introduction of the light 82. In the other case, shown in FIG. 5b, the introduction of light is brought about by means of the light guide 82 over the longitudinal direction L of the actuator component 20, that is to say the extension in the preferential direction 32 takes place perpendicularly to the introduction of the light.

Combinations of the light being introduced both in the lengthwise direction and in the widthwise direction are also conceivable. In other exemplary embodiments, the actuator component 20 is invariant in response to activation both in the longitudinal direction L and in the widthwise direction B, and the enumeration takes place perpendicularly thereto, for example in the direction of the thickness of the stack of layers shown in FIG. 3 or 4.

Figure 6:
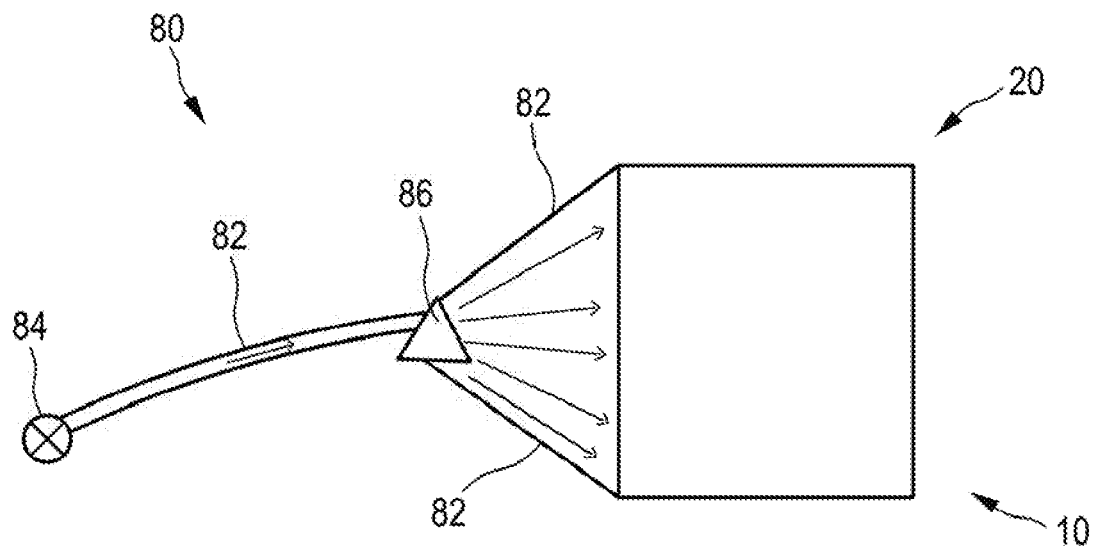
FIG. 6 shows a schematic view of a further exemplary embodiment of an actuator device.

FIG. 6 shows a further exemplary embodiment of an actuator device 10 schematically and by way of example. Before the entry into the actuator component 20, the control component 80 in the light guide 82 has an optical element 86 for fanning out the beam. While in the example an incident beam 82 enters the optical element 86, a broad fan of optical rays leaves the optical element 86. The fan of rays may be introduced, for example, by means of multiple light guides 82 on the output side into the actuator component 20. The optical element 86 is, for example, a prism or the like.

Figure 7:
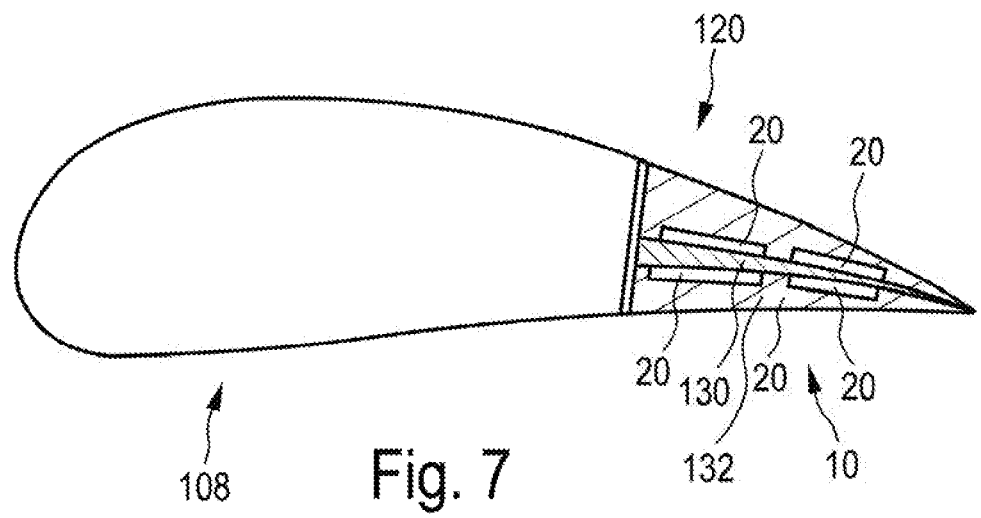
FIG. 7 shows a schematic view of an exemplary embodiment of an actuator device on a rotor blade.

FIG. 7 shows schematically and by way of example an exemplary embodiment of the actuator device 10 according to the invention which is used in a trailing edge region 120 of a rotor blade 108 of a wind turbine and is designed for implementing the activation of a servo flap. FIG. 7 shows the profile of the rotor blade 108 of the wind turbine in cross section. The trailing edge region 120 has in this embodiment a carrier substrate 130, which is arranged substantially in the middle of the profile. Arranged around the carrier substrate 130, both on the upper side and on the lower side in the example, are four actuator components 20. In this example, the actuator components 20 are two-dimensional actuators, which bring about a bending of the entire actuator component 20. For the shaping, and to complete the profile of the trailing edge region 120, the carrier substrate 130 and the actuator components 20 are enclosed in an elastic molding material 132.

Figure 8A:
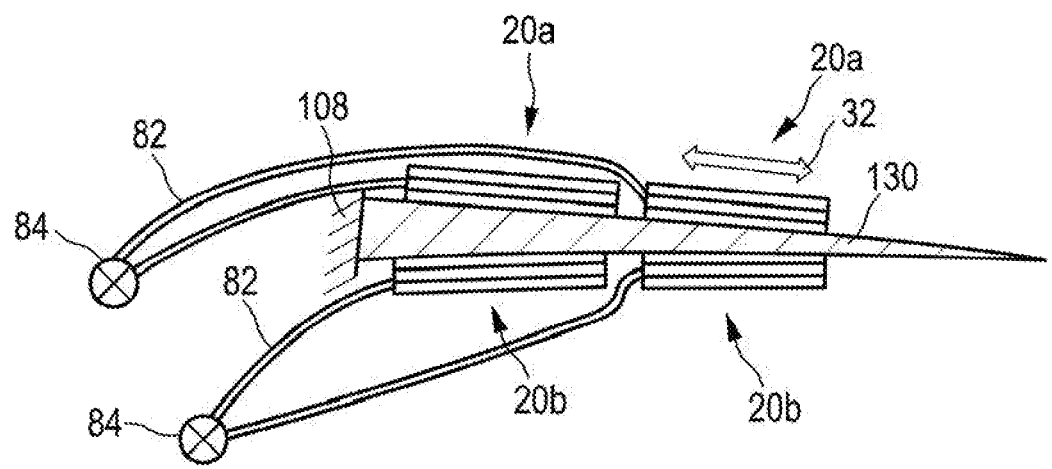
FIGS. 8a and 8b show schematic views of a detail of the exemplary embodiment shown in FIG. 7.
Figure 8B:
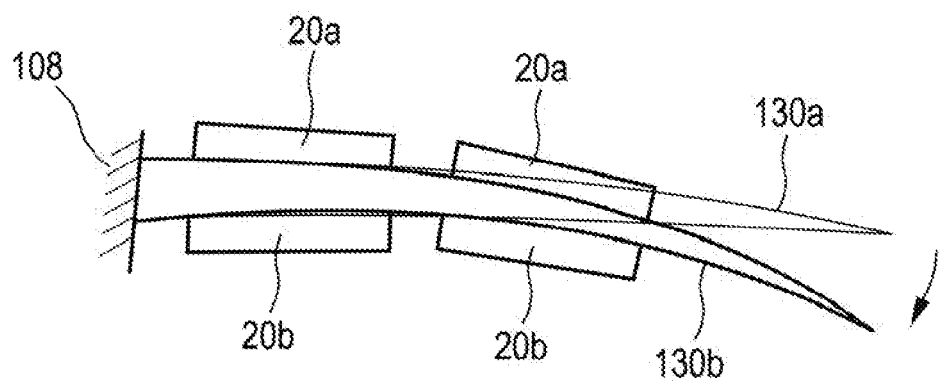

The functional principle of the trailing edge flap 120 shown in FIG. 7 is shown in detail with reference to FIGS. 8a and 8b. FIGS. 8a and 8b show the trailing edge or flap region 120 enlarged and without the elastic molding material 132 in the profile. The carrier substrate 130, which, for example, comprises a GFRP or similar material or consists thereof, is shown in FIG. 8a in a neutral position. That is to say that the carrier substrate 130 has not been deflected, which corresponds to a neutral flap position. Both on the upper side and on the underside, that is to say, with respect to the rotor blade 108, both on the suction side and on the pressure side, the carrier substrate 130 has two actuator components 20a and 20b, respectively. The preferential direction 32 of the respective actuator components 20a, 20b runs in the direction of the profile chord of the rotor blade 108. The carrier substrate 130 is attached at the front end, that is to say the end that points in the direction of the leading edge of the rotor blade 108, to the rotor blade 108.

The actuator components 20a and 20b are respectively activated by an independent light source 84, since the activation of the actuator components 20a may be different from the activation of the actuator components 20b, as further described below. Because the actuator components 20a are activated on the suction side, to perform an extension in the preferential direction 32, the carrier substrate 130 undergoes a bending, which corresponds to the changeover from the position 130a to the position 130b in FIG. 8b. In a preferred embodiment, the actuator components 20b are activated simultaneously in such a way that they undergo a compression at the same time. Consequently, the bending of the carrier substrate 130 does not have to take place counter to the actuator components 20b, but by contrast may even take place with their assistance. For the reverse process, that is to say the changeover of the carrier substrate from the bent position 130b to the neutral position 130a, a reverse activation of the actuator components 20*b* or 20*a* is necessary. For example, the actuator components 20*a* may be activated in such a way that they undergo a compression. Alternatively, or preferably in addition thereto, the actuator components 20*b* may be activated to undergo an extension. In FIG. 8, the actuator components 20 are shown by way of example as comprising three layers, two actuator layers with an exciting layer arranged in-between. It goes without saying that, in other exemplary embodiments, other configurations of the actuator components 20 may also be used.

In all of the embodiments, an activation, in particular by the control component 80, preferably comprises an illumination, a non-illumination or any desired combination or intermediate stage of illumination and non-illumination, for example illumination with reduced intensity, with modulations, variable patterns, wavelengths, etc. A simultaneous activation of multiple actuator components accordingly comprises for example also a simultaneous activation by illumination, by non-illumination or by each of the combinations just mentioned.

FIGS. 9*a* to 9*d* show a further exemplary embodiment of an actuator device 10 with a preferential direction 32, which is perpendicular to the direction with which the light guide 82 introduces light into the exciting layer 40.

Figure 9A:
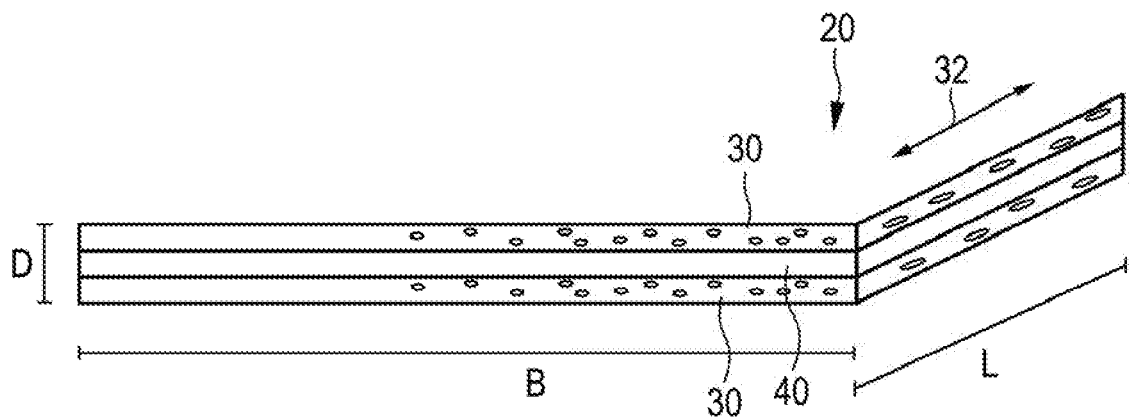
FIGS. 9a to 9d show schematic views of a further exemplary embodiment of an actuator device.
Figure 9B:
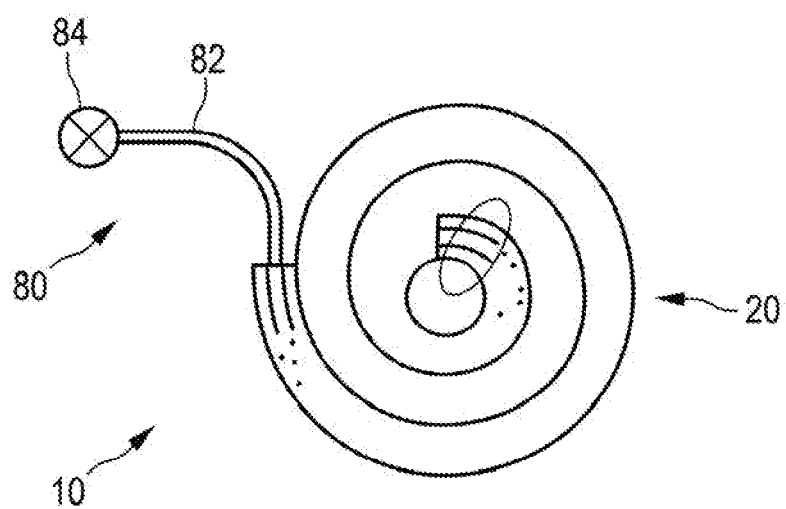
Figure 9C:
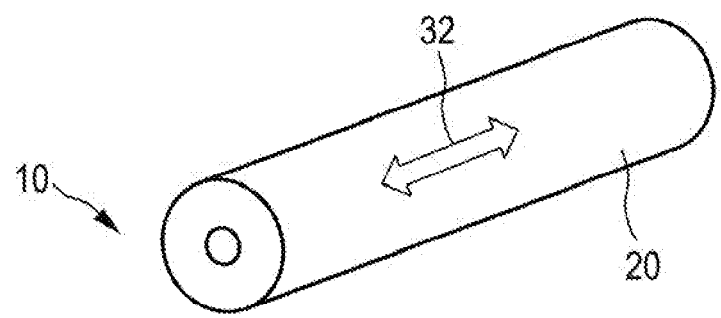

FIG. 9*a* schematically shows a two-dimensionally configured actuator component 20 with two actuator layers 30 and an exciting layer 40 lying in-between. The preferential direction 32 corresponds to a longitudinal direction defined as L; the individual layers of the actuator component 20 are stacked in a thickness in the direction D and the two-dimensional extent of the actuator component comprises not only the longitudinal direction L but also a widthwise direction B. FIG. 9*b* thus shows how the actuator component 20 shown in FIG. 9*a* is rolled up along the widthwise direction B. The preferential direction 32 does not change thereby; that is to say that it still runs in the longitudinal direction L, in FIG. 9*b* perpendicularly to the plane of the drawing. This is shown perspectively in FIG. 9*c*. In comparison with the representation of FIG. 9*a*, it can be clearly seen that the actuator device 10 requires less extent in the widthwise direction B. Consequently, an actuator that has the same actuator effect as the two-dimensional actuator shown in FIG. 9*a*, but requiring only a fraction of the base area, can be realized. This is particularly advantageous for applications in which space is critical.

Figure 9D:
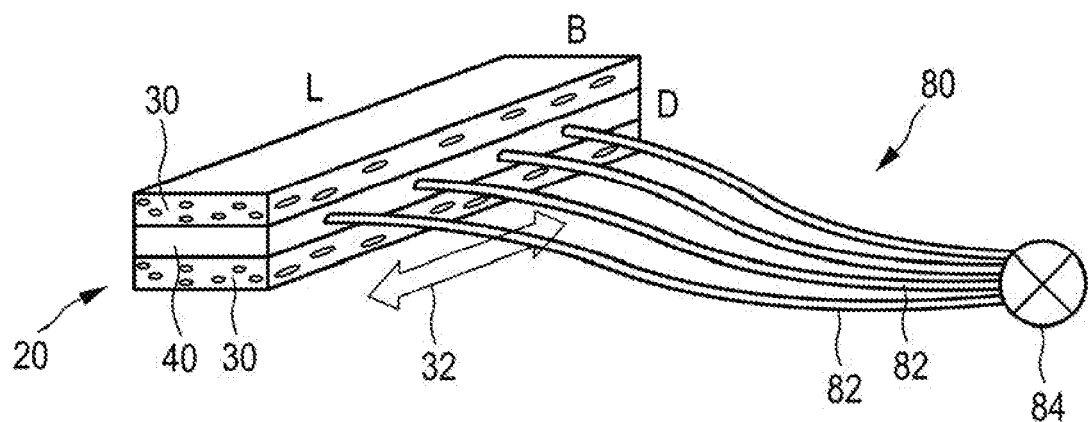

In FIG. 9*d*, a detail of the actuator component 20 shown in FIG. 9*a* is schematically and perspectively shown, while depicting the connection of the control component 80 including the light source 84 and multiple light guides 82, which introduce light into the exciting layer 40 at various positions in the longitudinal direction L.

Figure 10:
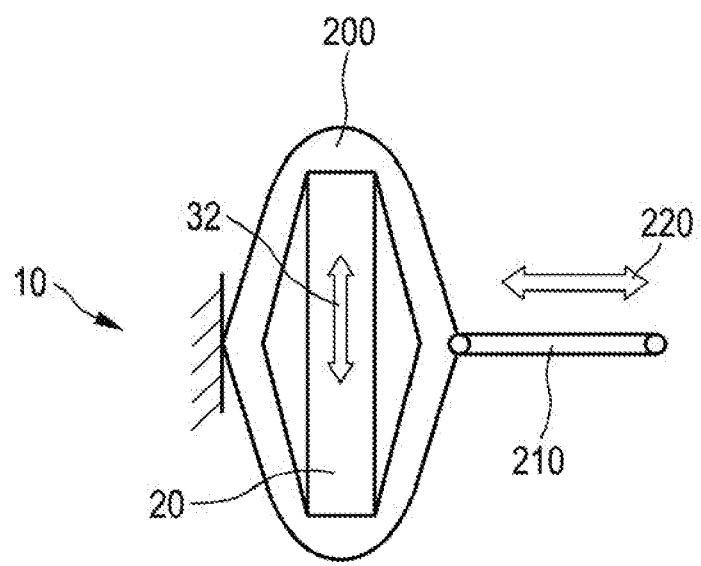
FIG. 10 shows a schematic view of an exemplary embodiment with an amplification frame.

FIG. 10 shows schematically and by way of example an exemplary embodiment of the actuator device 10, with an amplification frame 200 for transforming the movement of the actuator in the preferential direction 32. In this exemplary embodiment, the actuator component 20 is preferably configured as a stack of layers, the preferential direction 32 corresponding to the stacking direction of the layers. The amplification frame 200 transforms the movement in the preferential direction 32 to produce as a result an actuator direction 220 substantially perpendicular thereto with a transformation ratio that can be set. For example, in this way, a push-pull rod 210 can be moved over a much greater distance in the actuator direction 220 than the actuator component 20 extends or is compressed in the preferential direction 32. The design of the actuator is similar to the known design of a piezo stack; typical amplification factors for the amplification frame 200 are in the range of around 5. That is to say that an extension by, for example, 100 µm in the preferential direction 32 results in an extension by, for example, 500 µm along the actuator direction 220. The amplification frame 200 is just one example of a transformation device, and the push-pull rod 210 is also just one example of a coupling element; other implementations are known to a person skilled in the art.

Figure 11:
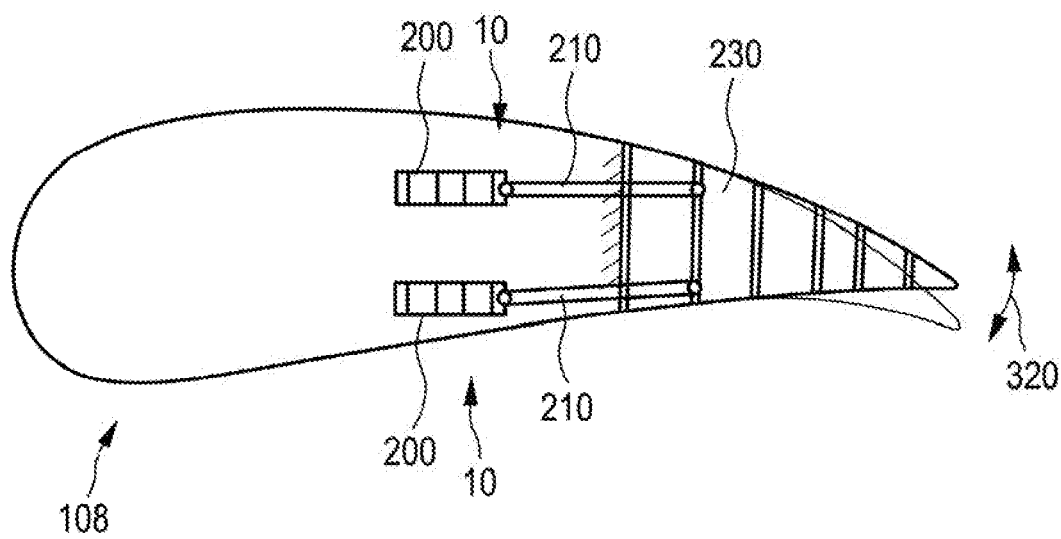
FIG. 11 shows schematically and by way of example a cross section of a rotor blade with a lift flap.

FIG. 11 shows schematically and by way of example a cross section of a rotor blade 108 with a lift flap 230, which is controlled by two actuator devices 10, as shown for example in FIG. 10. Each of the actuator devices 10 has the amplification frame 200 and brings about an activation of the push-pull rods 210, so that the flap 230 is deflected along a deflecting direction 320. In comparison with a servo flap, the lift flap 230 substantially does not bend, but instead is mechanically displaced as a whole. For this purpose, preferably the two push-pull rods 210 are moved in opposite directions, so that there is a tilting of the flap 230 in the direction 320. Although in this example push-pull rods 210 are used as force transmitters, all other mechanical implementations are of course also conceivable in other exemplary embodiments.

Although lift flaps and servo flaps have been described by way of example as active elements in exemplary embodiments, the above advantages can also be achieved for other active elements, for example vortex generators and the like. Combinations, such as for example a combined lift and servo flap, are also advantageously conceivable.

Figure 12:
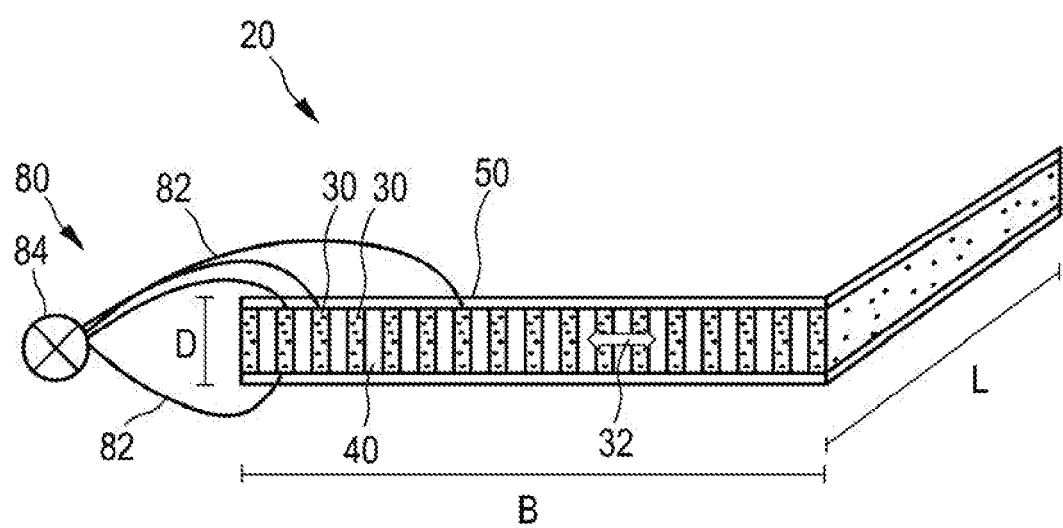
FIG. 12 shows schematically and by way of example a perspective view of a further exemplary embodiment of an actuator device.

FIG. 12 schematically shows a further exemplary embodiment of a two-dimensionally configured actuator component 20, as shown for example in FIG. 9*a*. FIG. 12 shows a two-dimensional actuator, in which the extent of the actuator layers 30 and exciting layers 40 is perpendicular to the actuator area with which the actuator is in connection with a substrate, for example part of the rotor blade of the wind turbine. The embodiment can consequently be regarded as a stack actuator, from which a thin slice with a thickness D has been cut off and laid out flat along the widthwise direction B and lengthwise direction L. The arrangement allows an extension under strain in the preferential direction 32, which lies in the two-dimensional plane. The preferential direction 32 is perpendicular to the actuator layer 30, which are stacked along the preferential direction 32. In this exemplary embodiment, the actuator component 20 also comprises a mirror coating 50, which acts as a reflective layer and ensures an optimum introduction of the excitation light from the light guides 82 into the exciting layers 40.

Figure 13:
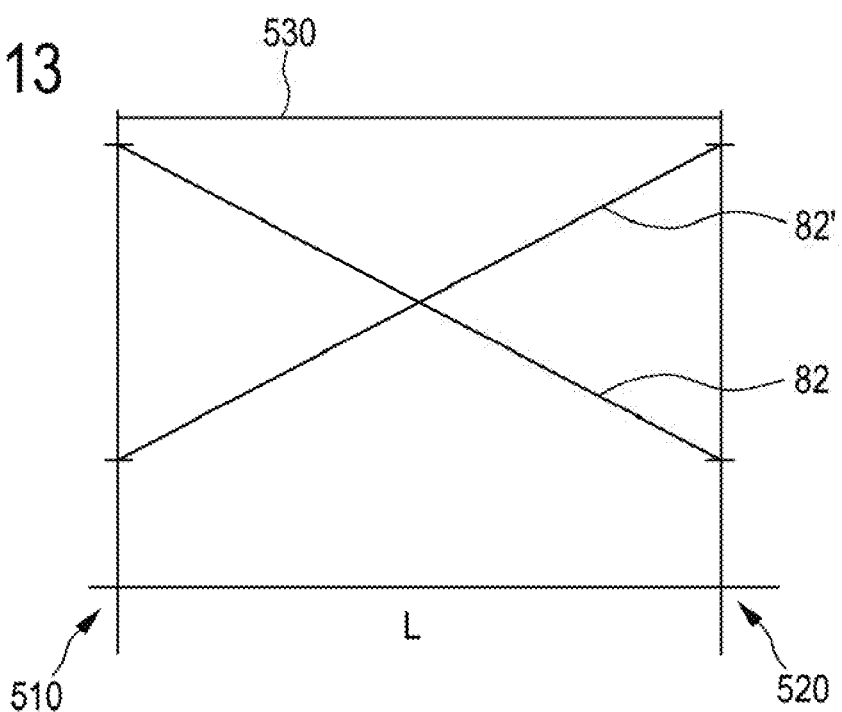
FIG. 13 shows schematically and by way of example a course of the light output from a light guide.

FIG. 13 shows schematically and by way of example a course of the light output from a light guide 82. The light yield is represented on the vertical axis, while the course over a length L of the light guide 82 is represented on the horizontal x axis. The course proceeds from an entry point 510 of the light guide 82 through the exciting layer 40 up to an end point 520, at which the light guide 82 ends. It can be seen that in this simplified example, the light yield decreases linearly with the length through the exciting layer 40. The light yield of an oppositely aligned light guide 82' is additionally represented in FIG. 13. The light guide 82' consequently has the highest light yield at the end point 520 of the first light guide 82, at which the second light guide 82' is led into the exciting layer 40. It consequently runs substantially oppositely to the light guide 82. If the light guide 82 and the light guide 82' are led in the vicinity of one another in the exciting layer 40, an overall light input 530 that is substantially constant over the entire length L is obtained. The solution according to the invention is specifically that the lowering of the light yield in one of the light guides 82, 82' is compensated by a further light guide, arranged in the direct vicinity of this light guide, being designed in a substantially opposite manner.

Figure 14:
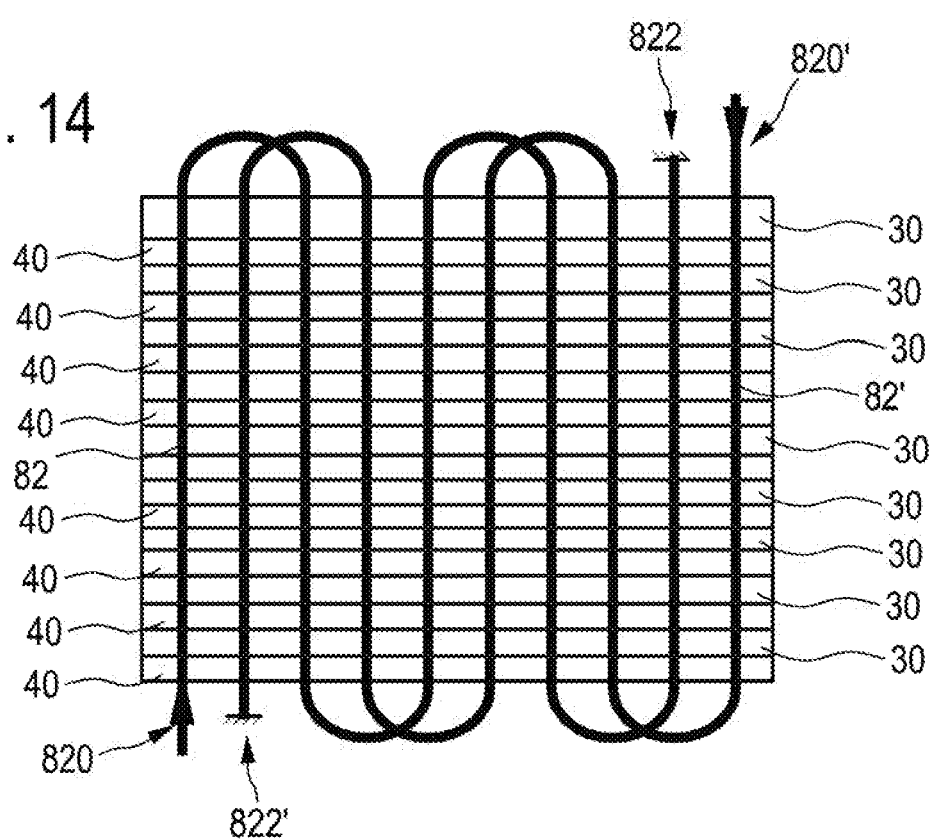
FIG. 14 shows schematically and by way of example an example of the arrangement of light guides.

An example of a possible arrangement of two such light guides 82, 82' is schematically shown with reference to FIG. 14. In this exemplary embodiment, two light guides 82, 82' are led over the multiplicity of edges of the exciting layers 40 of a side surface of an actuator stack, from an entry 820, 820' to an exit 822, 822'. The two light guides 82, 82' are in this case led in a meandering form, arranged substantially parallel and respectively offset by half an oscillation. To put it another way, one of the two light guides 82, 82' in each case extends in the space between two loops of the other of the light guides 82, 82'.

In this example, the reversal of the direction of the light guides 82, 82' is shown as performed outside the stack consisting of exciting layers 40 and actuator layers 30, while the reversal of the direction of the light guides 82, 82' may for example also be performed within one of the exciting layers 40. It is preferred that, in the region of the deflection of the direction, no light yield takes place, for example by lighting means or other surface changes of the light guide 82, 82'. If the changes in direction of the light guides 82, 82' are formed within the exciting layer 40, such a light yield may however also be provided in the region of the reversal curves, for example by lighting means. The light yield over the entire exciting layer corresponds approximately to the profile 530, as it is shown in FIG. 13, that is to say that the light yield is substantially constant over the entire surface area of the exciting layer 40 and also over all of the exciting layers 40.

Figure 15:
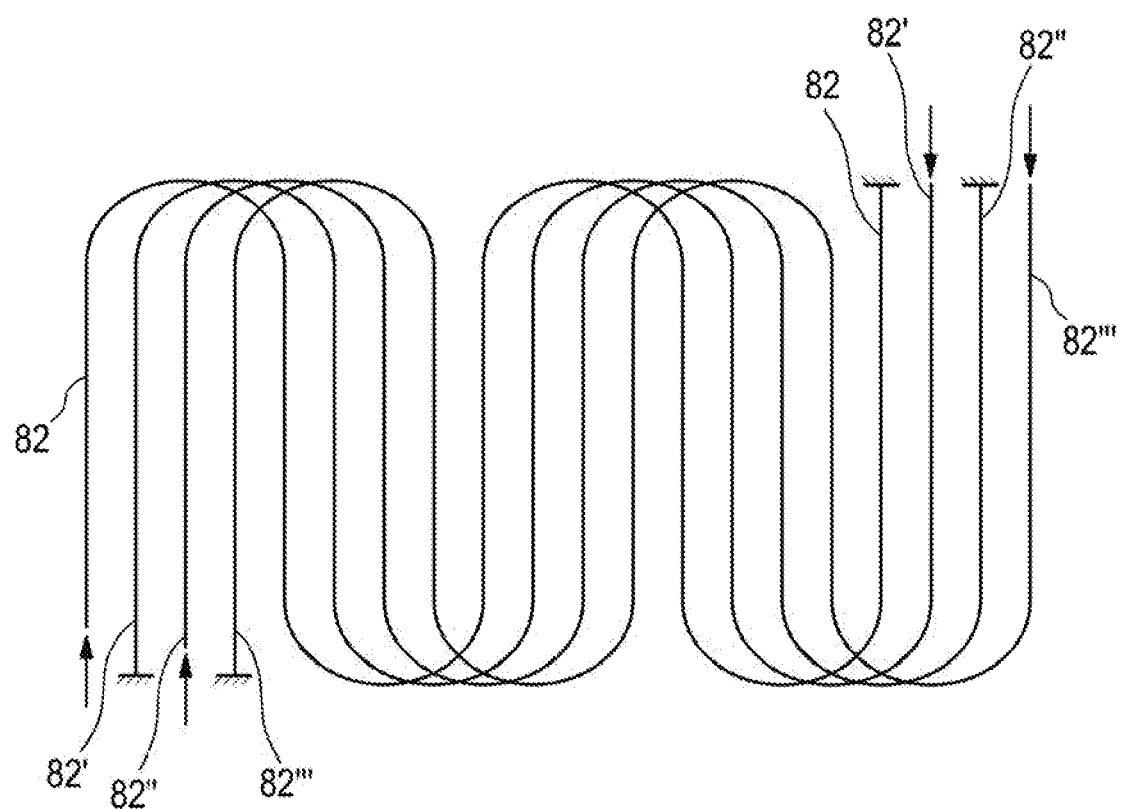
FIG. 15 shows schematically and by way of example a further example of the arrangement of light guides.

FIG. 15 shows schematically and by way of example a further example of the arrangement of four light guides 82, 82', 82" and 82'", wherein each of the light guides 82 to 82'" is formed substantially the same and, in comparison with the exemplary embodiment from FIG. 14, is inserted into the further light guides respectively between the two light guides 82, 82' shown there. Instead of the two light guides opposed in parallel, the arrangement of four such light guides 82 to 82'" is consequently provided in the example of FIG. 15, wherein a pair—that is to say light guides 82 and 82" or 82' and 82'"—respectively have the same light guiding direction. The arrangement with four light guides, as shown in FIG. 15, makes possible uniform illumination of the exciting layer 40 with in each case two different wavelengths or two spectral ranges on the same actuator surface. Preferably, one of the wavelengths, that is to say light of a certain color, may bring about an activation of the photoactuator of the actuator layer, while a second wavelength or color deactivates the photoactuator. The designs of FIG. 14 and FIG. 15 should of course only be understood as examples; other geometrical designs which result in making a homogeneous light yield of the exciting layer 40 possible are also available to a person skilled in the art without any difficulty. In this case, any desired even-numbered multiple of the two counter-running light guides can be configured.

Figure 16:
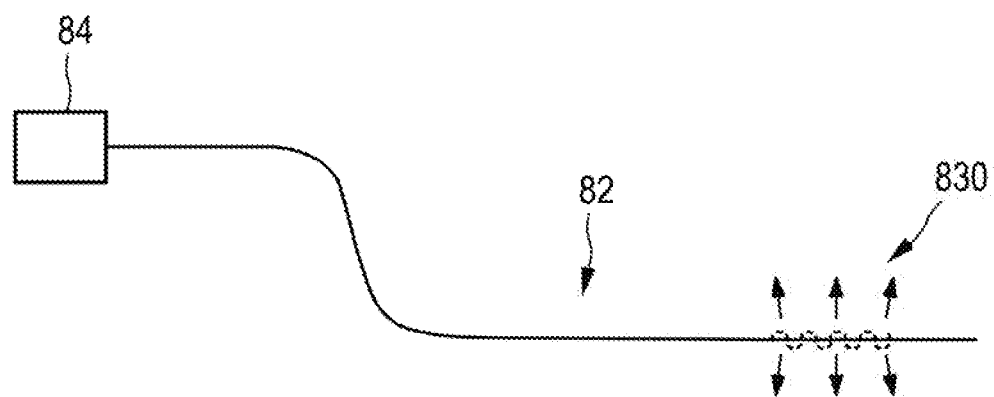
FIG. 16 shows schematically and by way of example the course of a light guide which has a nano coating at the distal end thereof.

FIG. 16 shows schematically and by way of example the course of a light guide 82 which has a nano coating 830 at the distal end thereof. The nano coating 830 may for example be provided in the region of the exciting layer 40. The nano coating 830 has the effect that, in the region in which the nano coating 830 has been applied, light leaves diffusely in all directions around the fiber. With suitable means, a light output in only some of the spatial directions can of course also be realized.

Figures 17, 18:
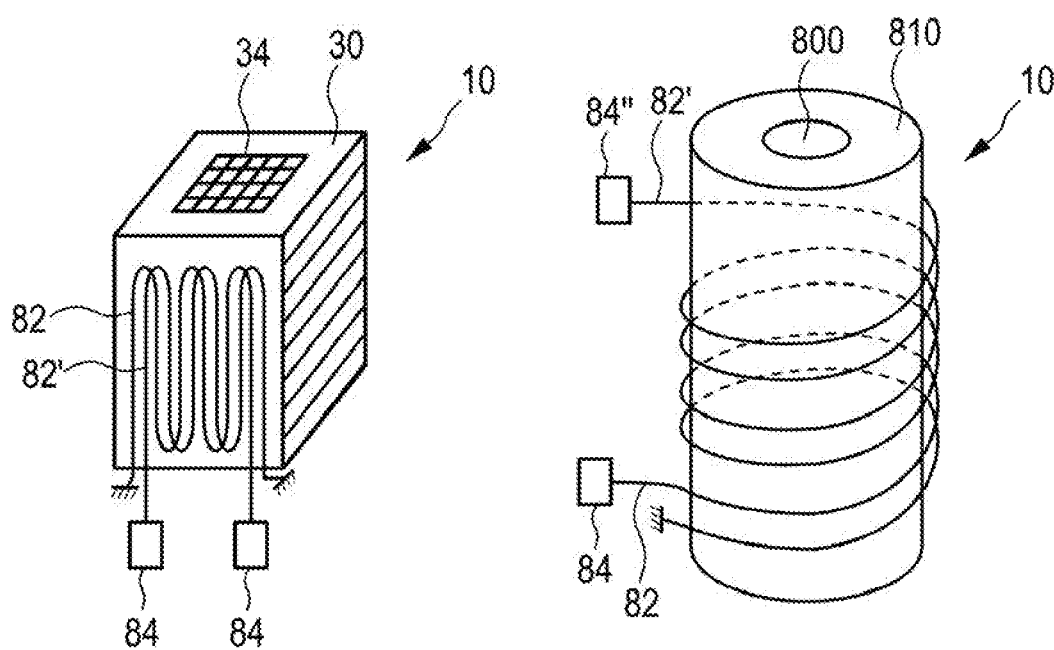
FIG. 17 shows schematically and by way of example a perspective view of an embodiment of an actuator device.
FIG. 18 shows schematically and by way of example a perspective view of an embodiment of an actuator device.

FIG. 17 shows schematically and by way of example a perspective view of an embodiment of an actuator device 10 in which multiple layers with photoactuators 34 are arranged stacked one on top of the other. In this schematic view, the structure under the photoactuator molecules is indicated by a grid; in reality, the arrangement is of course not restricted to this grid structure. In this example, a light guide runs in a meandering form in the vertical direction, perpendicularly to the direction of extent of the individual layers 30, 40. This exemplary embodiment may preferably be combined with the arrangement of the light guides 82 according to FIG. 14 or FIG. 15, so that a uniform light input is made possible over the entire stack arrangement of the stack actuator.

FIG. 18 finally shows a further exemplary embodiment of an actuator device 10, which in this exemplary embodiment in the form of a cylinder is provided with an inner bore 800. Two light guides 82, 82' extend spirally, running oppositely around the cylinder 810. While in this exemplary embodiment the helix of the light guides 82, 82' is shown around the outside of the cylinder 810, in another exemplary embodiment it is also possible for the light to be guided in the middle of the cylinder 810.

The invention claimed is:

1. An actuator device for a wind turbine comprising:
    an actuator component; and
    a control component,
    wherein the actuator component has an actuator layer with a preferential direction and an exciting layer that is parallel to the actuator layer,
    wherein the actuator layer comprises a photoactuator, wherein the photoactuator is configured to change a strain, or a stress, or both the strain and the stress of the actuator layer in the preferential direction based on excitation light,
    wherein the exciting layer is configured to guide excitation light into the actuator layer,
    wherein the control component comprises a light source and a light guide, wherein the light source is arranged away from the exciting layer and is coupled to the exciting layer by the light guide, and
    wherein the light guide runs through the exciting layer in different directions.

2. The actuator device as claimed in claim 1, wherein the actuator component is formed as a stack actuator component with a plurality of stacked actuator layers and exciting layers, wherein the light guide is formed over a plurality of edges of the exciting layers on at least one layer surface of the stack actuator component.

3. The actuator device as claimed in claim 1, comprising at least two light guides, wherein at least two of the light guides enter the exciting layer from different sides.

4. The actuator device as claimed in claim 1, wherein a direction of the light guide from the light source is referred to as a light guiding direction of the light guide, wherein adjacent portions of different light guides in the exciting layer have at least partially opposite light guiding directions.

5. The actuator device as claimed in claim 1, wherein a light output from the light guide decreases with a length of the light guide, wherein at least two light guides extend in or along the exciting layer in such a way that a uniform light input into the actuator layer occurs.

6. The actuator device as claimed in claim 5, wherein at least two light guides run opposite to one another, at least in certain portions, through the exciting layer.

7. The actuator device as claimed in claim 6, wherein an entry point of a first of the at least two light guides into the exciting layer is adjacent to an exit point of a second of the at least two light guides.

8. The actuator device as claimed in claim 6, wherein the at least two light guides have curved portions and parallel portions that extend through or along the exciting layer, wherein the parallel portions of the two light guides, respectively, alternate in the exciting layer.

9. An actuator device for a wind turbine comprising:
an actuator component; and
a control component,
wherein the actuator component has an actuator layer with a preferential direction and an exciting layer that is parallel to the actuator layer,
wherein the actuator layer comprises a photoactuator, wherein the photoactuator is configured to change a strain, or a stress, or both the strain and the stress of the actuator layer in the preferential direction based on excitation light,
wherein the exciting layer is configured to guide excitation light into the actuator layer,
wherein the control component comprises a light source and a light guide, wherein the light source is arranged away from the exciting layer and is coupled to the exciting layer by the light guide, and
wherein the light guide runs through the exciting layer in different directions,
wherein a light output from the light guide decreases with a length of the light guide,
wherein the light guide includes at least two light guides extend in or along the exciting layer in such a way that a uniform light input into the actuator layer occurs,
wherein at least two light guides run opposite to one another, at least in certain portions, through the exciting layer,
wherein the at least two light guides have curved portions and parallel portions that extend through or along the exciting layer, wherein the parallel portions of the two light guides, respectively, alternate in the exciting layer, and
wherein a direction of the at least two light guides are reversed at the curved portions.

10. The actuator device as claimed in claim 1, wherein the actuator component has a cylindrical shape with a hollow bore, wherein at least a portion of the light guide is arranged in the hollow bore.

11. The actuator device as claimed in claim 1, wherein a region of an end of a light guide remote from the light source has a nano coating.

12. The actuator device as claimed in claim 1, wherein the control component comprises a plurality light guides, wherein the plurality light guides are configured to guide at least one of: different wavelengths, spectral ranges, or both.

13. A rotor blade of a wind turbine with an actuator device as claimed in claim 1 and an active element, wherein the actuator device is configured to control the active element.

14. The rotor blade as claimed in claim 13, wherein:
the actuator component of the actuator device is configured as a bending actuator component,
the active element is a servo flap, and
the actuator component is mounted in surface contact over a region of the servo flap.

15. The rotor blade as claimed in claim 14, wherein:
the actuator component of the actuator device is configured as an extension actuator component,
the active element is a lift flap, and
the rotor blade has a transforming unit for transforming movement of the actuator component into a control of the lift flap.

16. The rotor blade as claimed in claim 15, wherein:
the actuator device has an amplification frame that encloses the actuator component, and
the transforming unit has a push/pull rod for coupling the amplification frame to the lift flap.

17. A wind turbine comprising a rotor, and a rotor blade as claimed in claim 13 coupled to the rotor.

18. A method comprising:
assembling an actuator device as claimed in claim 1 on a rotor blade, wherein the assembling comprises attaching the actuator component to the rotor blade.

19. The method as claimed in claim 18, further comprising coupling the control component to the actuator component.

20. The actuator device as claimed in claim 1 wherein the light guide runs through the exciting layer in opposite directions.

* * * * *